United States Patent [19]

Van Vliet et al.

[11] 4,338,885

[45] Jul. 13, 1982

[54] CATTLE HEAD HOLDER

[76] Inventors: Jasper A. Van Vliet, 3930 Claus Rd.; James E. Elder, 1443 Albers Rd., both of Modesto, Calif. 95355

[21] Appl. No.: 212,689

[22] Filed: Dec. 3, 1980

[51] Int. Cl.³ .............................................. A01K 29/00
[52] U.S. Cl. ...................................... 119/96; 119/151
[58] Field of Search .................... 119/151, 152, 96, 98, 119/99; 231/2 R

[56] References Cited

U.S. PATENT DOCUMENTS

| | | | |
|---|---|---|---|
| 1,727,290 | 9/1929 | Jones | 119/98 |
| 2,816,525 | 12/1957 | Hoagland | 119/96 X |
| 2,831,458 | 4/1958 | Jones | 119/98 |
| 3,221,707 | 12/1965 | Pearson | 119/98 |
| 3,511,216 | 5/1970 | George | 119/147 |
| 3,572,295 | 3/1971 | Tansel | 119/98 |
| 3,747,569 | 7/1973 | Hannon | 119/96 |

Primary Examiner—Gene Mancene
Assistant Examiner—Robert P. Swiatek

[57] ABSTRACT

Disclosed herein is a device for holding the head of cattle, livestock, and the like while the head of the animal extends through plural vertical rails which are laterally translatable, such rails commonly being used today to serve as a barrier one side of which the animals can find, of which is the feeding area of the livestock. The rails are caused to constrict the animal's head preventing withdrawal of the head by being more closely spaced, and thereafter the device according to the present invention is applied by hooking two ends of a pivot member between two successive rails and applying a snout engaging device on the animal, the device including a lever for forcing the animal's head in a constrained and still position against the rails and the device so that successive operations such as dehorning, medicating or the like can be administered to the animal while the animal's head remains stationary.

8 Claims, 2 Drawing Figures

U.S. Patent     Jul. 13, 1982     4,338,885
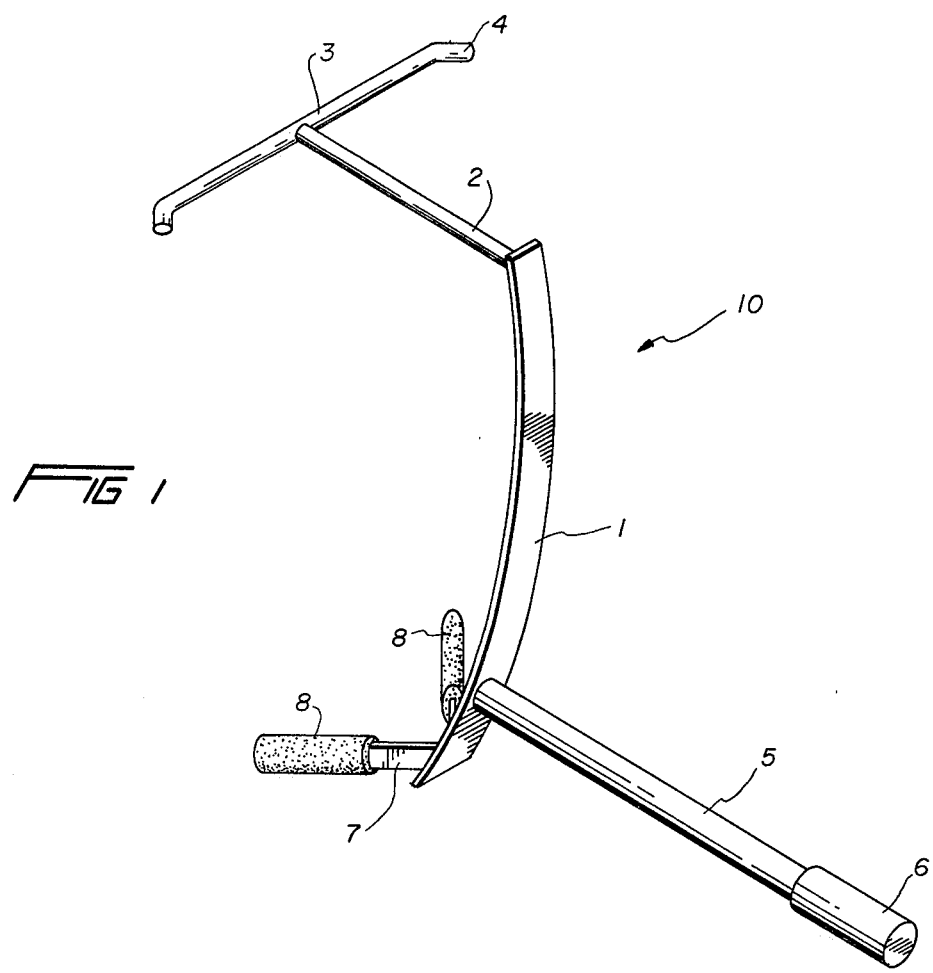
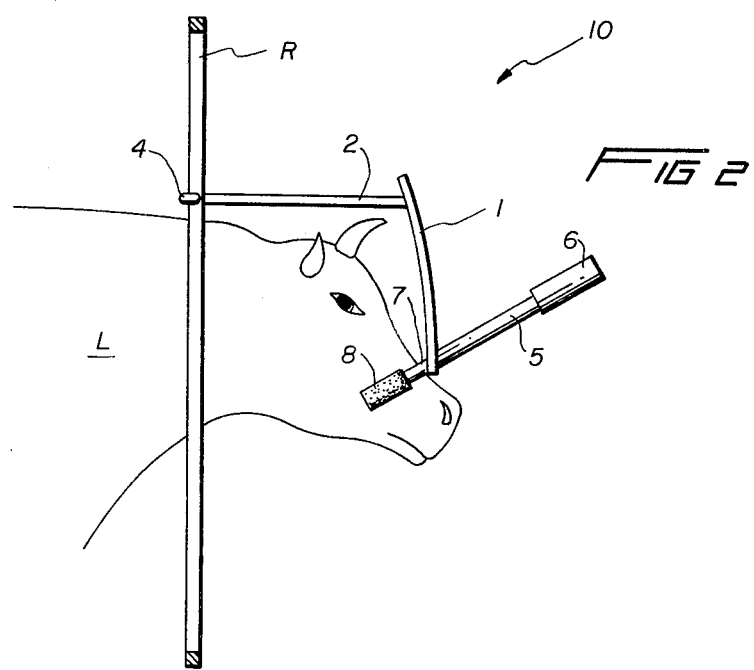

CATTLE HEAD HOLDER

BACKGROUND OF THE INVENTION

In animal husbandry, it is frequently necessary to treat the livestock as by medication and the like for the obvious benefits associated therewith. In addition, it is also desired to dehorn the animals so as to reduce the likelihood of injury to a livestock owner's precious commodities. In this regard, various methods have been proposed in the past for constraining and restraining the head of an animal and the prior art of which applicant is aware comprises the following patents.

Roark U.S. Pat. No. 4,059,073
Koon U.S. Pat. No. 3,153,399
Sanders U.S. Pat. No. 2,595,302
Marmet U.S. Pat. No. 2,313,833
Baker U.S. Pat. No. 3,766,890
Westervelt et al. U.S. Pat. No. 3,967,343

Of these patents, the patent to Roark provides a teaching for constraining the neck of an animal for secure engagement, and although it is clear that the head of the animal is constrained relative to motion in and out of the head gate, rotation of the head cannot be controlled with the device as taught in this patent.

Similarly, the patent to Koon while restricting the head of the animal from axial movement along the length of the spine of the animal, the relative rotation of the head, is not controlled in this patent.

The patent to Sanders teaches the use of an animal restraining device in which a collar is placed on the animal to deter the animal from turning back on itself to prevent self nursing. Clearly, this neither constrains the animal from axial movement along the length of the spine of the animal, nor does it deter rotation of the head.

The remaining references appear to diverge even further from that which the instant application teaches, said teaching being adequately summarized by noting that an animal whose head frequently extends between the rails of a confinement pen in order to feed itself is provided with plural vertical rails through which the head is allowed to pass, these rails being laterally translatable so as to constrain the head from withdrawal between the rails and thereafter the device according to the present invention is applied so that the head of the livestock is constrained between the rails and against the cattle head holder according to the present invention so that various operations, such as medicating, dehorning and the like can be most expeditiously effected.

SUMMARY AND OBJECTS OF THE INVENTION

Accordingly, it is an object of this invention to provide a cattle head holder which constrains the animal's movement in all planes of motion.

It is a further object of this invention to provide a device of the character described above which is easy to manipulate, and extremely effective in use.

It is yet another object of this invention to provide a device of the character described above in which the device is extremely lightweight, rapidly deployable, and can be used without fear of damaging the animal.

It is still another object of this invention to provide a device of the character described above in which the likelihood of injuring the animal by use of the device according to the present invention is extremely unlikely.

It is a further object of this invention to provide a device of the character described above which is extremely inexpensive to manufacture, and durable in construction.

These and other related objects will be made manifest when considering the following detailed specification taken in conjunction with the appended drawing figures wherein it is taught that a cattle head holder has been provided which limits the range of motion of the animal's head in all directions for effectively medicating or dehorning an animal wherein the device includes an elongate strip serving as a supporting device for a pivoting member attached thereto, a snout engaging member adapted to engage a terminal portion of the snout of the animal, and a handle type lever which effectively uses a beneficial mechanical advantage to constrain the animal between the animal head holder and the rails through which the head of the animal has passed, a traditional form of feeding these animals.

BRIEF DESCRIPTION OF THE DRAWING FIGURES

FIG. 1 is a perspective view of the apparatus according to the present invention; and FIG. 2 is a side view thereof showing it in use and operation with the head of a cattle and its associated rail constraining member.

DESCRIPTION OF THE PREFERRED EMBODIMENT

Referring to the drawings now, where like reference numerals refer to like parts throughout the various drawing figures, reference numeral 10 is directed to the cattle head holder according to the present invention.

This holder 10 as best seen in FIGS. 1 and 2 can generally be regarded as having an arcuate elongated strip of material 1 which serves as a support member for the various components which coact to provide a very efficient head constraining device. The top most portion of the arcuate strip 1 has on the concave base thereof a T-shaped rod emanating rearwardly therefrom wherein the base 2 of the T-shaped rod is securely affixed to the concave side of the arcuate strip 1. The base 2 of the T-shaped rod terminates in a cross member 3 the extremities of which are provided with hooked ends 4 which as shown in FIG. 2 engage in successive vertical rails R of a cattle pen so that two such hooked ends and the intermediary bar 3 provide an axis about which the cattle holder 10 can pivot. Cattle pens commonly are provided with a plurality of vertical rails every other one of which can translate laterally and in most pens of this type, the confined area or pen contains the cattle therewithin, and the outer perimeter of the pen is used as a feeding area so that animals are used to sticking their heads in between the rails for feeding purposes. Once such an event occurs, the head of the cattle is placed through the vertical rails, every other member of the rail is translated laterally to constrain the head of the animal between successive rails. Although the animal is then constrained from axial translation relative to the spine of the animal, rotation of the head is still a problem. Accordingly, the device according to the present invention is applied so that the hooks engage successive rails and the arcuate strip 1 extends downwardly as best shown in FIG. 2.

The lower portion of the arcuate strip 1 has on the concave surface thereof a V-shaped snout means 7 which is adapted to straddle the snout of the animal. In order to assure that the animal will not be harmed in the use of this device, cushions 8 are provided at the extremities of the V-shaped snout means, the base of the snout means 7 being affixed to the concave face of the arcuate strip. Opposite the snout means 7 and on the convex surface of the arcuate strip a lever means 5 extends outwardly therefrom terminating in a padded hand grip 6 so that mechanical advantage is provided to pivot the cattle head holder about hook ends 4 and the horizontal axis 3 so that in use and operation, the chin of the animal is pressed against the rail and the animal's head is held stationary and incapable of rotation. The horns of the animal can then be worked on, or various medications can be administered to the animal without an undo expenditure of time and effort in order to perform the operation.

It is proposed that the cattle head holder 10 be formed from a metallic alloy which is impervious to the elements, such as aluminum; but it is also contemplated that the device could be formed from a plastic material having the requisite strength and the like for efficient utilization. In any event, the pivoting means, lever means and snout means are all shown as extending from the arcuate strip which serves as the supporting device so that the device can easily be deployed with a single hand, and the animal's head reliably constrained, so that the free hand of the person can be used to provide whatever further operations on the head of the cattle may be required.

In view of the foregoing, it should be appreciated that there has been provided a device which not only restricts the animal from axial translation along the spine thereof, but also from motion of the animal's head in any direction, thereby reliably holding the animal's head stationary while assuring that the animal's head has not been damaged in any way.

Further, it should be apparent that numerous structural modifications are contemplated as being a part of this invention as set forth hereinabove and as defined hereinbelow in the claims.

What is claimed is:
1. A device for holding the head of livestock and the like which head extends through laterally translatable rails comprising, in combination:
   pivoting means on said device for moving said device about a horizontal axis between two of the rails,
   snout means on said device for engaging the snout of the livestock,
   and lever means on said device for forcing the head of the livestock to be constrained and stilled against the rails by exerting pressure on said snout means through said lever means while pivoting about said pivot means, whereby the head of the livestock can be worked on as by dehorning, medicating or the like, wherein said device includes an arcuate, elongate strip of material from which said pivoting, snout, and lever means extend and are supported, wherein said pivoting means comprises a T-shaped rod extending rearwardly from an upper portion of said strip on a concave surface thereof.
2. The device of claim 1 wherein said snout means comprises a V-shaped rod extending rearwardly from a lower portion of said strip on said concave surface thereof.
3. The device of claim 2 wherein said lever means comprises a handle extending outwardly from a convex surface of said strip.
4. The device of claim 3 wherein said pivoting means includes hooked ends on extremities of said T-shaped rod remote from said strip, a base of said T-shaped rod fastened to said strip, whereby said hooked ends engage two of the rails for pivotal movement about said hooked ends.
5. The device of claim 4 wherein said V-shaped rod is provided wth cushions on legs thereof, said V-shaped rod having a base connected to said strip, said cushions protecting the snout of the livestock.
6. The device of claim 5 wherein said handle has a padded grip on an extremity remote from said strip.
7. The device of claim 6 wherein said device is formed from metal.
8. The device of claim 6 wherein said device is formed from a plastic.

* * * * *